United States Patent [19]

Bauman et al.

[11] Patent Number: 4,482,043

[45] Date of Patent: Nov. 13, 1984

[54] PALLET CHANGING SYSTEM FOR A MACHINING CENTER

[75] Inventors: Spencer S. Bauman, Rockford; Dean L. Edwards, Belvidere, both of Ill.

[73] Assignee: White-Sundstrand Machine Tool Co., Belvidere, Ill.

[21] Appl. No.: 290,102

[22] Filed: Aug. 4, 1981

[51] Int. Cl.³ .............................................. B27B 25/00
[52] U.S. Cl. .................................. 198/339; 414/750; 29/823; 29/33 P
[58] Field of Search ............... 198/339, 346, 741, 747; 414/750, 749, 222; 29/791, 823, 568, 33 P

[56] References Cited

U.S. PATENT DOCUMENTS

| | | | |
|---|---|---|---|
| 2,988,234 | 6/1961 | Barothy et al. | 198/472 X |
| 3,099,873 | 8/1963 | Brainard et al. | 29/26 |
| 3,704,510 | 12/1972 | Sedgwick et al. | 29/568 |
| 3,825,245 | 7/1974 | Osburn et al. | 198/472 |
| 3,986,617 | 10/1976 | Blomquist | 409/221 |
| 4,075,753 | 2/1978 | Gusching et al. | 29/568 |
| 4,102,035 | 7/1978 | Voglrieder et al. | 29/568 |
| 4,118,844 | 10/1978 | Matsuzaki et al. | 29/27 C |
| 4,133,423 | 1/1979 | Zankl | 414/749 |
| 4,172,512 | 10/1979 | Clegg et al. | 198/339 |
| 4,173,817 | 11/1979 | Voglrieder et al. | 29/568 |

Primary Examiner—Robert J. Spar
Assistant Examiner—Dennis J. Williamson
Attorney, Agent, or Firm—Ronald L. Wanke

[57] ABSTRACT

A pallet changing system for a machine tool in which two pallets are shuttled back and forth over a track to maintain one pallet in a standby position while the other pallet is in a central machining position. A single saddle capable of indexing either pallet during machining is driven on the track. Telescoping covers extend between each track end and the associated pallet and also between the pallets to keep the track and saddle covered while permitting movement of the pallets over the track and relative to each other.

25 Claims, 11 Drawing Figures

PALLET CHANGING SYSTEM FOR A MACHINING CENTER

BACKGROUND OF THE INVENTION

1. Field of the Invention

This invention relates to a machining center and more particularly to a pallet changing system for a machining center.

2. Background Art

Machining centers are used to machine workpieces in various operations to within precise tolerances. In order to meet such tolerances, workpieces have been clamped to pallets which are themselves clamped to the machining center. A pallet having a workpiece to be machined can then be moved (known as indexing) to properly orient it with respect to the cutting tool of the machining center.

Pallet changers have been provided for changing pallets in the machining position of a machining center. When the machining of one workpiece is completed, pallets are exchanged on the machining center so that the pallet with the finished workpiece is replaced by a pallet with a new workpiece. Then, while machining of the new workpiece occurs, the finished workpiece may be replaced on the other pallet by a new piece so that the pallets can again be exchanged to locate still another new workpiece for machining.

One type of pallet changer which has been used is a rotary type changer which extends to pick up the pallet at the machining position, retracts with the picked up pallet and rotates to present a new pallet, and then extends to place the new pallet in the machining position. Unfortunately, it has not been possible to fully protect the components of this type of changer from the metal shavings which are produced during the machining of a workpiece and which can interfere with the proper working of the pallet changer mechanism.

Another type of pallet changer which has been used shuttles two pallets back and forth over a track or tracks between a machining position and a standby position. Most of the pallet changers of this type have also not been properly protected from metal shavings. Those pallet changers which have used covers to protect the track have, however, required separate indexing mechanisms associated with each pallet. This unnecessary duplication of parts has resulted in an increased possibility of system failure or error and also in an undesirable increase in cost.

This invention is directed towards overcoming one or more of the problems as set forth above.

SUMMARY OF THE INVENTION

A pallet changing system for a machine tool is disclosed in which two pallets are shuttled back and forth over a track to maintain one pallet in a standby position while the other pallet is in a central machining position. The pallets are associated with standby positions at opposite ends of the track. A single saddle capable of indexing either pallet during machining is driven on the track. Telescoping covers extend between each track end and the associated pallet and also between the pallets to keep the track and saddle covered while permitting movement of the pallets over the track and relative to each other.

In a typical cycle of operation, after a workpiece has been machined the saddle moves the pallet in the machining position to a standby position. The saddle then lowers to disengage from the pallet and moves down the track beneath the covers to the other pallet. The saddle is then caused to engage that pallet and move it to the central machining position. The cycle is repeated to change pallets in the machining position as new workpieces are placed on the pallet in the standby position while machining occurs on the workpiece associated with the pallet in the machining position.

One object of this invention is to provide a simple pallet changing system which permits near maximum utilization of the capabilities of the machining center.

Another object of this invention is to provide a simple pallet changing system having two pallets and a single saddle which indexes and changes the pallets. Use of a single saddle to control the motion of both pallets eliminates unnecessary duplicate parts, thereby simplifying the system and reducing its cost.

Still another object of the present invention is to provide a pallet changing system having covers which at all times protect the saddle and the track over which the saddle moves. Such covers keep both the saddle and track free of metal shavings to ensure proper operation of the pallet changing system.

DESCRIPTION OF THE PREFERRED EMBODIMENT

Figure 1:
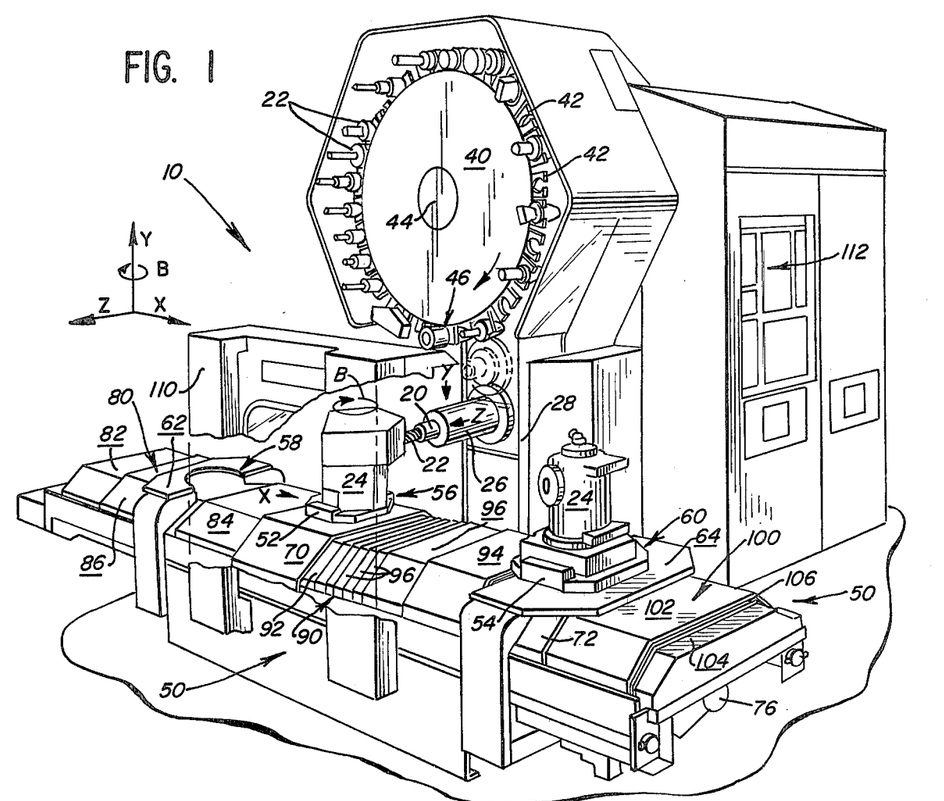
FIG. 1 is a perspective view of a machining center embodying the novel pallet changing system.

A machining center 10 embodying the present invention is shown in FIG. 1.

The machining center 10 includes a spindle 20 which holds a tool 22 for use in machining a workpiece 24. The spindle 20 is mounted within a quill 26 for rotation around the Z axis. The quill 26 may be advanced and retracted along the Z axis through a spindle housing 28. The spindle housing 28 may be moved up and down along the Y axis. Suitable Y axis machine ways (not shown) guide the spindle housing 28.

A rotating drum 40 having tool grippers 42 is included in the machining center 10 for exchanging tools 22 in the spindle 20. The drum 40 rotates around a fixed pivot point 44 to locate a selected tool gripper 42 and tool 22 at a tool changing position 46 having fixed coordinates in the plane defined by the Y and Z axes.

A pallet changing system 50 is also included in which two pallets 52, 54 are shuttled back and forth between a central machining position 56 and standby positions 58, 60. A stand 62, 64 is provided at each standby position 58, 60 for supporting the pallet 52, 54 while the workpiece 24 clamped to the pallet 52, 54 is changed.

Each pallet 52, 54 is associated with a hood member 70, 72 which moves along the X axis with the associated pallet 52, 54. An opening in each hood 70, 72 exposes a portion of the bottom of each pallet 52, 54 to the area beneath the respective hood 70, 72.

A single saddle 74 (not seen in FIG. 1) is driven along the X axis by a drive screw 76 and may be coupled to the exposed bottom of either pallet 52, 54. Suitable X axis machine ways (not shown) accurately guide the saddle 74 when it is driven by the drive screw 76. The saddle 74 may be coupled to either pallet 52, 54 to move the coupled pallet 52, 54 along the X axis to both shuttle the pallet 52, 54 between the machining position 56 and the standby position 58, 60 and to index a workpiece 24 during machining. Further, the saddle 74 may rotate the pallet 52, 54 with respect to the hood members 70, 72 (rotation around the Y axis defined as B axis motion) to provide a four axis machining center (motion being in the X, Y, Z and B directions).

Three sets of telescoping covers 80, 90, 100 are provided to protect the X axis machine ways from metal shavings and also to protect the saddle 74 when it is driven between the pallets 52, 54. The first set of telescoping covers 80 is associated with one end of the pallet changing system 50 and has its terminal (or end) covers 82, 84 rigidly fixed to the end of the system 50 and to the hood member 70 respectively. The second set of telescoping covers 90 extends between the pallets 52, 54 and has its terminal covers 92, 94 fixed to the hood members 70, 72 respectively. The third set of telescoping covers 100 is similar to the first set 80 and is associated with the opposite end of the pallet changing system 50, the terminal covers 102, 104 of the third set 100 being rigidly fixed to the hood member 72 and the end of the system 50 respectively.

Each set of telescoping covers 80, 90, 100 also has an appropriate number of intermediate covers 86, 96, 106 telescopically related to the terminal covers 82, 84; 92, 94; 102, 104.

A shield 110 may be provided at the machining position 56 to protect the machine operator from metal shavings. In addition, the machining center 10 may be provided with a computer numerical control (CNC) 112 to control the operation of the machine tool.

Figure 2:
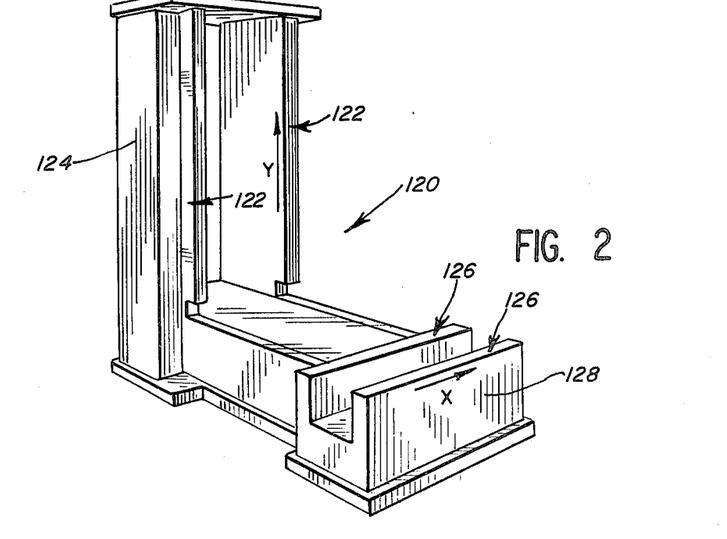
FIG. 2 is a perspective view of the base/column construction of the machining center.

FIG. 2 shows the base/column weldment 120 which is used to accurately fix the X and Y axis machine ways. The front surface 122 of the column portion 124 of the weldment 120 is machined on both sides as is the top surface 126 of the base portion 128 of the weldment 120. The machine ways are bolted to the surfaces 122, 126 to permanently fix the X and Y axes. With the single weldment construction as shown, the X and Y axis machine ways may thus be precisely and permanently aligned with respect to one another.

Figure 3:
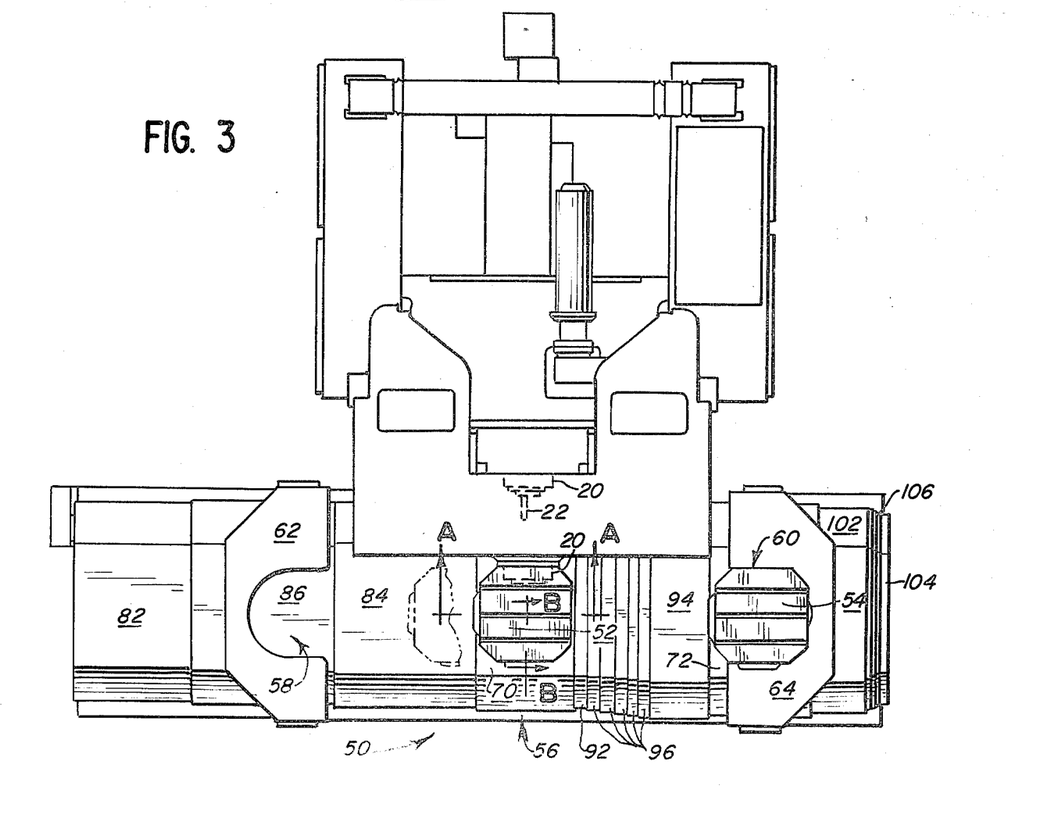
FIG. 3 is a plan view of the machining center.

FIG. 3 is a top view of the machining center 10 showing the arrangement of the pallet changing system 50 with a pallet 52 in the machining position 56. The pallet 52 may be moved along the X axis to various positions as desired during machining, several of those positions being indicated in phantom in FIG. 3. The spindle 20 may be advanced along the Z axis to move a tool 22 to engage a workpiece 24 (not shown in FIG. 3) which would be clamped to the pallet 52.

Further details of the overall machining center 10 are disclosed in the U.S. patent application Ser. No. 290,103 of Spencer S. Bauman and Dean L. Edwards, entitled MACHINING CENTER and filed the same day as this application. The disclosure of that Patent Application is hereby incorporated by reference.

Saddle Construction

Figure 4:
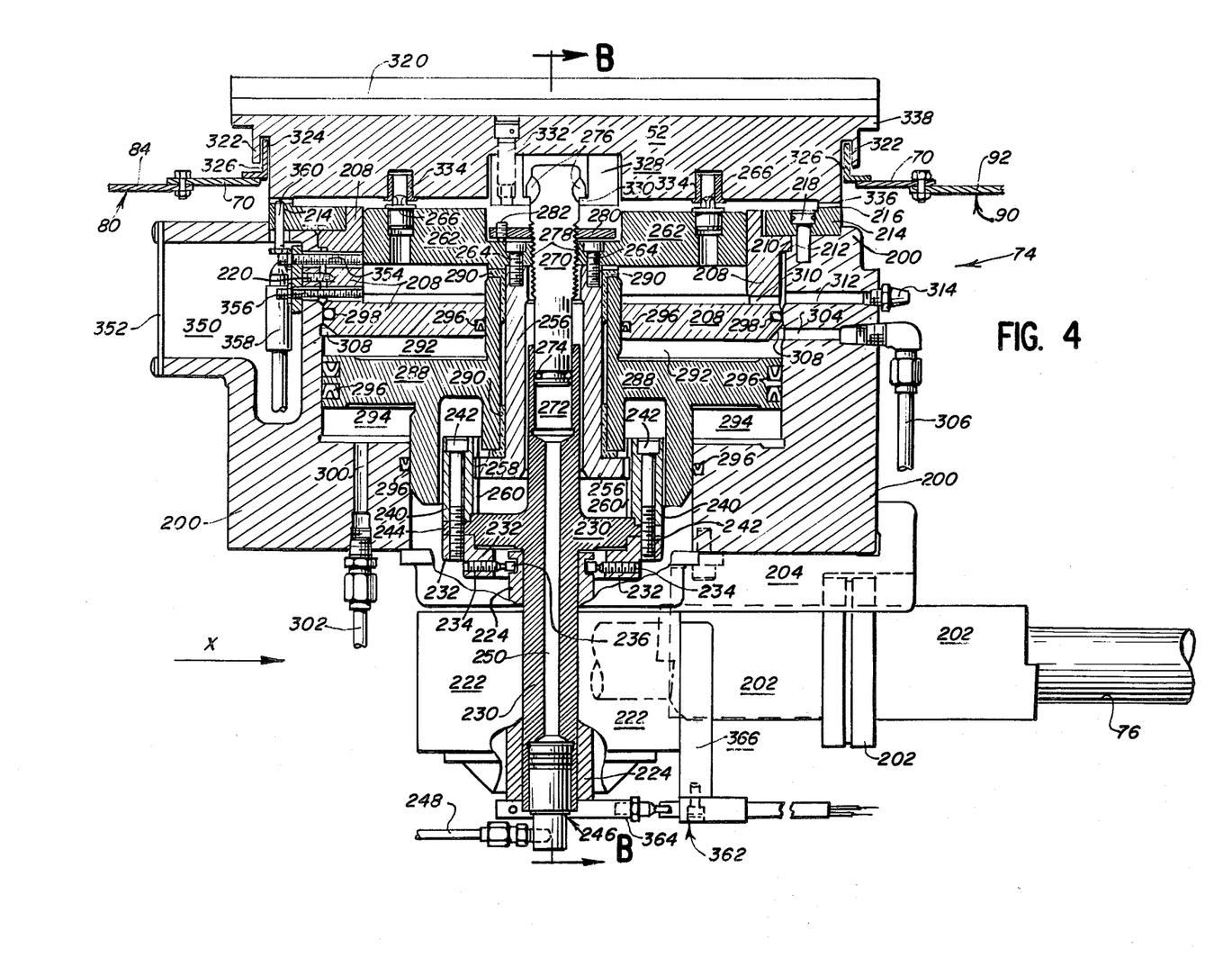
FIG. 4 is a cross-sectional view of a pallet coupled to the saddle taken along line A—A of FIG. 3.

FIG. 4 is a cross-sectional view of the saddle 74 when coupled to a pallet 52 during the machining of a workpiece 24 (not shown). The saddle includes a housing 200 which rides on the X axis machine ways (not shown) in a suitable manner to maintain proper alignment. A ball nut 202 is fixed to the housing 200 by a bracket 204 so that the saddle 74 moves over the X axis machine ways when the drive screw 76 is rotated.

A cylinder cap 208 having an annular flange 210 rests on a shoulder 212 of the housing 200. An annular ring 214 having a curvic coupling 216 is located on the housing 200 and cylinder cap 208 and is secured to the housing 200 by screws 218. The annular ring 214 thus holds the cylinder cap flange 210 onto the housing shoulder 212 to fix the housing 200, cylinder cap 208, and annular ring 214 together. A socket set screw 220 is also used to ensure an anti-rotation connection between the cylinder cap 208 and the housing 200.

A worm gear box 222 is fixed to the housing 200 and is driven by an electric motor (not shown) to rotate the gear box output shaft 224 when desired.

A drive shaft 230 is located within a bore through the output shaft 224. A retaining ring 232 is mounted on the output shaft 224 by a number of socket set screws 234, each of which bias a key portion 236 into a recess in the output shaft 224 to provide a backlash-free connection. The retaining ring 232 is also rigidly fixed to a drive collar 240 and the drive shaft 230 by a suitable number of screws 242 which clamp a flange portion 244 of the drive shaft 230 between the retaining ring 232 and the drive collar 240. Accordingly, the output shaft 224 rotates the retaining ring 232, the drive shaft 230 and the drive collar 240 together.

A sealed rotary joint 246 is provided between a pneumatic pressure line 248 and the bottom of the drive shaft 230 to permit the introduction of pneumatic pressure into a central air passageway 250 for a purpose to be described hereinafter.

An index shaft 256 with an external spline 258 is located around the drive shaft 230. The external spline 258 mates with an internal spline 260 on the drive collar 240. The index shaft 256 is thus rotatably driven with the drive shaft 230 and may move axially with respect to the drive shaft 230.

A lift plate 262 is mounted on the index shaft 256 by suitable means such as the screws 264 shown. Locator pins 266 are mounted in holes in the lift plate 262.

A lug pin 270 is located within an opening 272 at the top of the drive shaft 230. The lug pin 270 may move axially within the drive shaft opening 272 and an O-ring 274 provides a seal between the lug pin 270 and the drive shaft 230. The lug pin 270 has retractable lugs 276 around its upper end which project from the cylindrical boundaries of the lug pin 270 when the lug pin 270 is in a normal nonenergized state. To retract the lugs 276 within the cylindrical boundaries of the lug pin 270, line 248 is pressurized. The pressure extends through the sealed rotary joint 246, the passageway 250 and the drive shaft opening 272 to energize the lug pin 270 and retract the lugs 276. A lug pin 270 which may be used is made by Avibank Manufacturing Company, Inc. of Burbank, Calif. although other lug pins having retractable lugs would also be suitable.

A portion of the lug pin 270 has threads 278 over which the lift plate 262 is screwed. A lock nut 280 is also screwed onto the lug pin 270 and, by using a set screw 282, the lock nut 280 and lift plate 262 (and thus the index shaft 256) are rigidly fixed to the lug pin 270.

A piston 288 is located around the index shaft 256 for moving the index shaft 256, lift plate 262, and lug pin 270 axially. Bushings 290 are provided between the piston 288 and the index shaft 256 and lift plate 262 so that the index shaft 256 and lift plate 262 move axially with and may rotate with respect to the piston 288.

Upper and lower chambers 292, 294 are defined for driving the piston 288. The chambers 292, 294 are sealed by suitable block vee pack seals 296 and an O-ring 298.

The saddle housing 200 has an air passageway 300 open to the bottom of the lower chamber 294 and connected to a pneumatic line 302 for introducing (or venting) pressure in the lower chamber 294 to drive the piston 288 up (or permit motion down).

An air passageway 304 is open to the upper chamber 292 and connected to a pneumatic line 306 for introducing (or venting) pressure in the upper chamber 292 to drive the piston 288 down (or permit motion up). The air passageway 304 associated with the upper chamber 292 is open at a groove 308 around the cylinder cap 208 to enable pneumatic pressure to be introduced into the upper chamber 292 even when the piston 288 abuts the cylinder cap 208.

Additional air passageways 310, 312 are also provided through the cylinder cap 208 and housing 200 respectively to inlet and vent air from the chamber between the lift plate 262 and the cylinder cap 208 as the lift plate 262 is driven up and down. A muffler 314 is provided to reduce the noise resulting from air flow through these air passageways 310, 312 and to prevent the entrance of foreign material which may be suspended in this air.

The pallet 52 mounted on the saddle 74 includes grooves 320 (best seen in cross-section in FIGS. 6 and 7) to aid in clamping a workpiece 24 rigidly to the pallet 52.

The pallet also includes an annular rim 322 defining a groove 324 which receives an annular flange 326 fixed to the hood member 70 by suitable means such as welding. Thus, the pallet 52 may rotate with respect to the hood member 70 and the rim 322 and flange 326 prevent metal shavings from getting beneath the hood member 70. Terminal covers 84, 92 are shown fixed to the hood member 70.

A collar 328 defining an annular shoulder 330 is fixed within a recess on the bottom of the pallet 52 by a screw 332. Also fixed to the bottom of the pallet 52 are locator collars 334 which may receive the locator pins 266. Further, a curvic coupling 336 is on the bottom of the pallet 52 and may mate with the saddle curvic coupling 216 to fix the pallet 52 against rotation.

Figure 5:
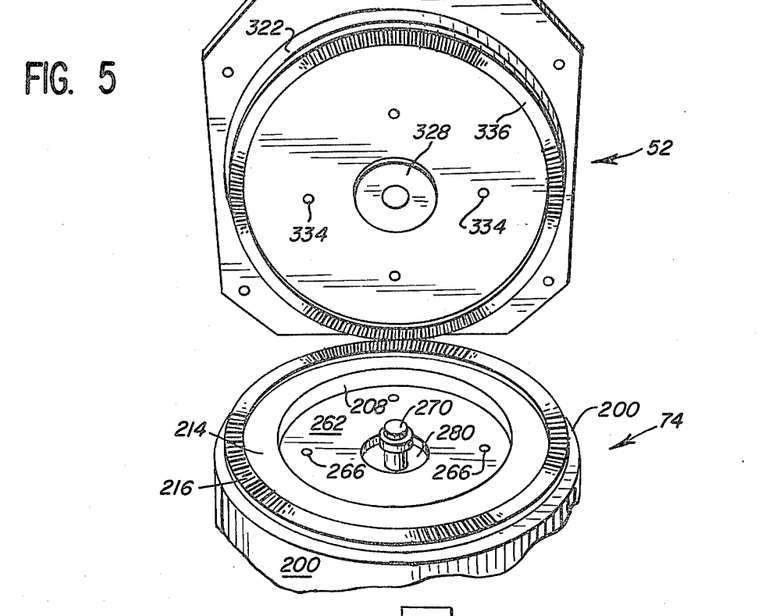
FIG. 5 is a perspective view showing the top of the saddle and the bottom of a pallet which has been tipped up.

A perspective view of the top of the saddle 74 and the bottom of a pallet 52 is shown in FIG. 5. The pallet is tilted up to permit viewing of the two surfaces. The lug pin 270 is at the center of the saddle 74 with the lock nut 280 and lift plate 262. The lug pin 270 mates with the collar 328 on the bottom of the pallet 52. The locator pins 266 are on the lift plate 262 and engage the lift collars 334 when the lift plate 262 is raised from the cylinder cap 208.

The annular ring 214 is around the periphery of the saddle 74 and includes the curvic coupling 216. The curvic coupling 216 may engage with the curvic coupling 336 of the pallet 52 to lock the pallet 52 and saddle 74 against rotation. The annular rim 322 of the pallet 52 can be seen around the pallet curvic coupling 336.

Saddle Operation

FIG. 4 shows a pallet 52 coupled to the saddle 74 as occurs during machining. Pneumatic pressure from line 306 is present in the upper chamber 292. The pressure biases the piston 288 down and the piston 288 acts through the bushings 290 and index shaft 256 to bias the lug pin 270 down. The lugs 276 of the lug pin 270 bear on the shoulder 330 of the collar 328 so that the pallet 52 is held down. The curvic couplings 336, 216 of the pallet 52 and saddle 74 thus mate to fix the pallet 52 against rotation.

With the pallet 52 locked in this manner, the spindle 20 of a machining center 10 may be advanced along the Z axis so that the tool 22 engages and machines the workpiece 24. If X axis motion is desired during machining, the drive screw 76 may be turned to move the entire saddle 74 while the pallet 52 remains coupled thereto.

If it is desired to index the pallet in the B axis direction, the following occurs. Pneumatic pressure is removed from the upper chamber 292 and introduced through line 302 into the lower chamber 294, causing the piston 288 to move upward and carry the lift plate 262 with it. Initially, the locator pins 266 will fit into and engage the locator collars 234. Further upward motion lifts the pallet 52 to disengage the curvic couplings 336, 216, at which point, the pallet 52 rests entirely on the locator pins 266 as shown in FIG. 6.

Figure 6:
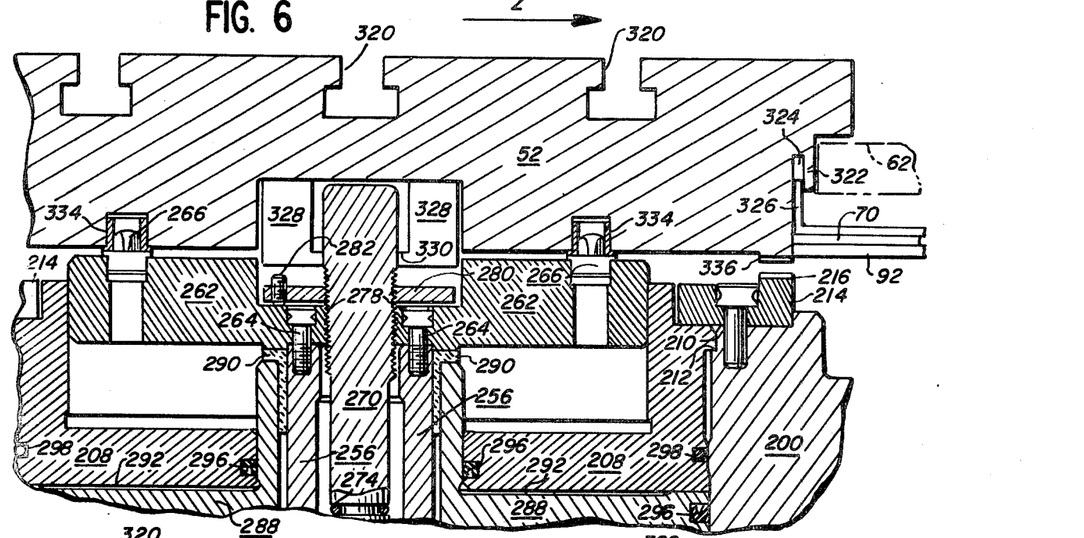
FIG. 6 is a partial cross-sectional view taken along line B—B of FIG. 3 showing the pallet in the raised position.

With the pallet raised as shown in FIG. 6, the output shaft 224 is driven to cause the lift plate 262 to rotate. The locator pins 266 carry the pallet 52 in that rotation without slippage. Once the desired position is reached, pneumatic pressure is removed from the lower chamber 294 and introduced through line 306 into the upper chamber 292, causing the piston 288 to move down so that the lug pin 270 holds the pallet 52 with the curvic couplings 336, 216 engaged. Further machining may then occur with the pallet 52 locked in place.

When the machining of a workpiece 24 is completed, the pallet 52 is lifted to the raised position of FIG. 6 and the lug pin 270 is energized to retract the lugs 276. The drive screw 76 drives the saddle 74 and raised pallet 52 from the machining position 56 to the standby position 58.

The pallet 52 is also rotated to the zero position while raised. This rotation can occur while the drive screw 76 drives the saddle 74. The zero position is the rotational position of the pallet 52 at the standby position 58. Always returning the pallet 52 to the zero position ensures that the pallet 52 is coupled to the saddle 74 in the same relative position each time it is picked up at the standby position 58. This is particularly important for a machining center 10 which uses computer controls.

Once the saddle 74 reaches the standby position 78 with the pallet 52 in the zero position, the end flanges 338 of the pallet 52 are supported over the stand 62 (shown in phantom in FIG. 6). The piston 288 is then biased downward, lowering the pallet 52 until it rests on the stand 62. Since the lugs 276 are retracted, the piston 288 continues to move downward, carrying the lift plate 262 and lug pin 270 with it until the piston 288 rests on the saddle housing 200. The saddle 74 is then in the changing position shown in FIG. 7. In the changing position, the saddle 74 is completely free of the supported pallet 52 with the curvic couplings 336, 216 disengaged and the lug pin 270 beneath the pallet collar 328.

The saddle 74 may then be driven over the X axis machine ways to the other standby position 60, where the lug pin 270 and lift plate 262 may be raised to pick up the other pallet 54 (see FIG. 6) and move it to the machining position 56 (see FIG. 4).

Motion Sensors

Various sensors are provided to indicate the saddle condition during operation. An electric housing area 350 is provided in the saddle housing 200 for several of the sensors. A removable cover 352 is provided to permit access to the area 350.

Electric non-contact proximity switches 354, 356 are provided through the housing 200 and cylinder cap 208 to detect axial motion of the lift plate 262. Each switch 354, 356 has a sensing head which is flush with the inner wall of the cylinder cap 208. When the metal lift plate 262 is at the height of the switch 354, 356, it is sensed by the sensing head and closes the circuit of the switch 354, 356.

The two switches 354, 356 are provided to sense the three different conditions of the lift plate 262. When the pallet 52 is clamped to the saddle 74 as shown in FIG. 4, only the upper switch 354 is closed. When the pallet 54 is in the raised position shown in FIG. 6 for indexing or transferring to the standby position 58, the lift plate 262 is sensed by neither of the switches 354, 356 and thus both are open. Finally, when the saddle 74 is in the changing position shown in FIG. 7, both switches 354, 356 are closed by sensing the lift plate 262.

A switch 358 is also provided in the electric housing area 350 to detect engagement of the curvic couplings 336, 216. A dowel 360 extends through the annular ring 214 and has a lower end resting on the switch 358. When the curvic couplings 336, 216 are engaged, the curvic coupling 336 of the pallet 52 pushes the dowel 360 down to trip the switch 358.

A switch 362 is also provided to sense the zero position of the drive shaft 230. A dog 364 rotates with the drive shaft 230 and engages the switch 362 to indicate the zero position. The switch 362 is mounted to the worm gear box 222 by a bracket 366.

Other suitable sensors may be included as desired to indicate other saddle conditions.

Pallet Changing System Operation

Overall operation of the pallet changing system 50 is illustrated by the diagrammatical views of FIGS. 8a–8d.

Figures 8A, 8B, 8C, 8D:
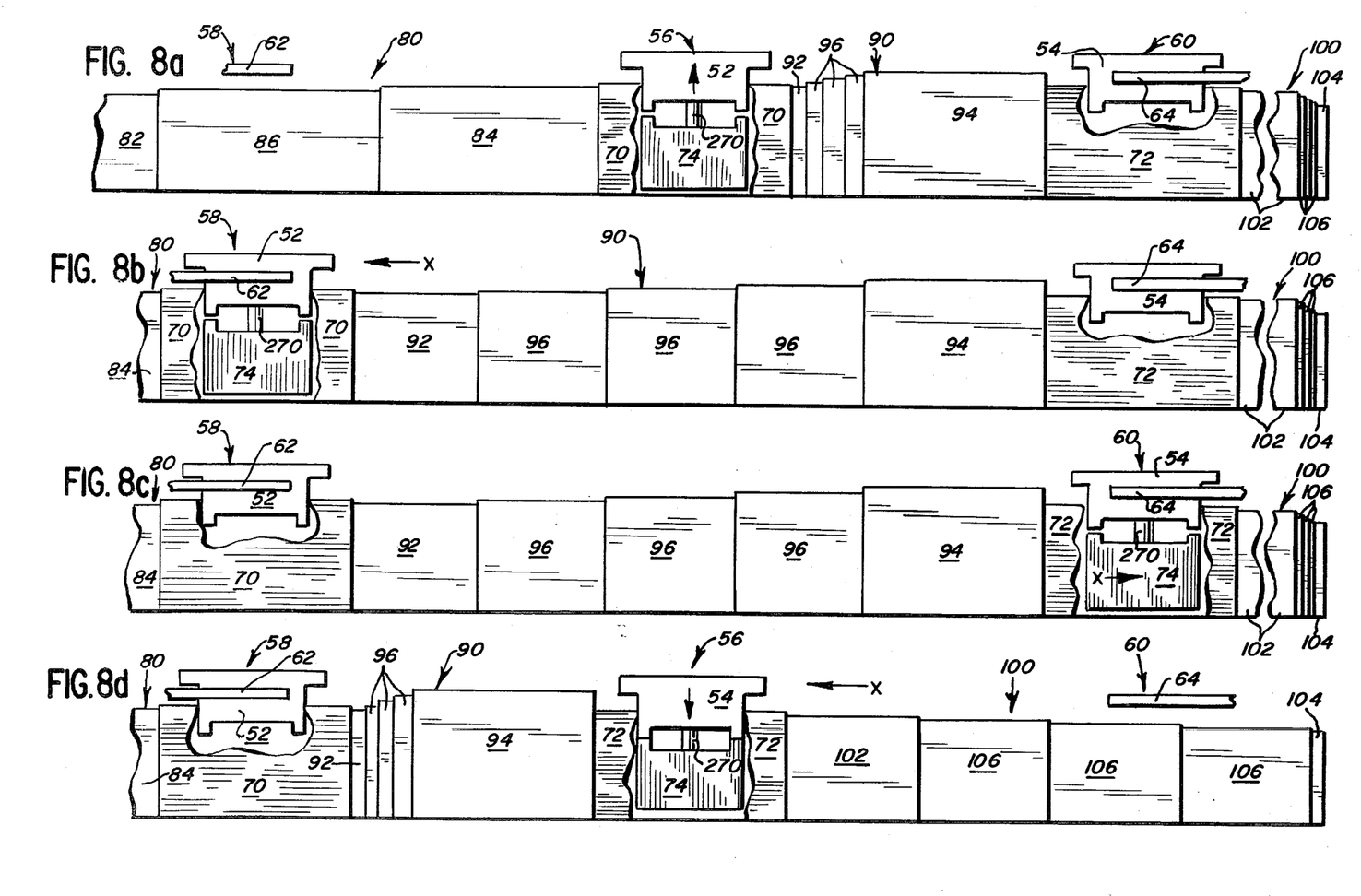
FIGS. 8a–8d are diagrammatic side views showing the operation of the pallet changing system.

Upon completion of the machining operations, the pallet 52 in the machining position 56 is lifted to the raised position (see FIG. 6) as shown in FIG. 8a. The saddle 74 then is driven in the X direction to move the pallet 52 over the stand 62 at the standby position 58. The hood member 70 is carried with the pallet 52 during this motion, pulling the terminal cover 92 along with it so as to cause the second set of telescoping covers 90 to telescope apart as shown in FIG. 8b. In addition, the first set of telescoping covers 80 are caused to telescope together (and disappear from view to the left of FIG. 8b).

Figure 7:
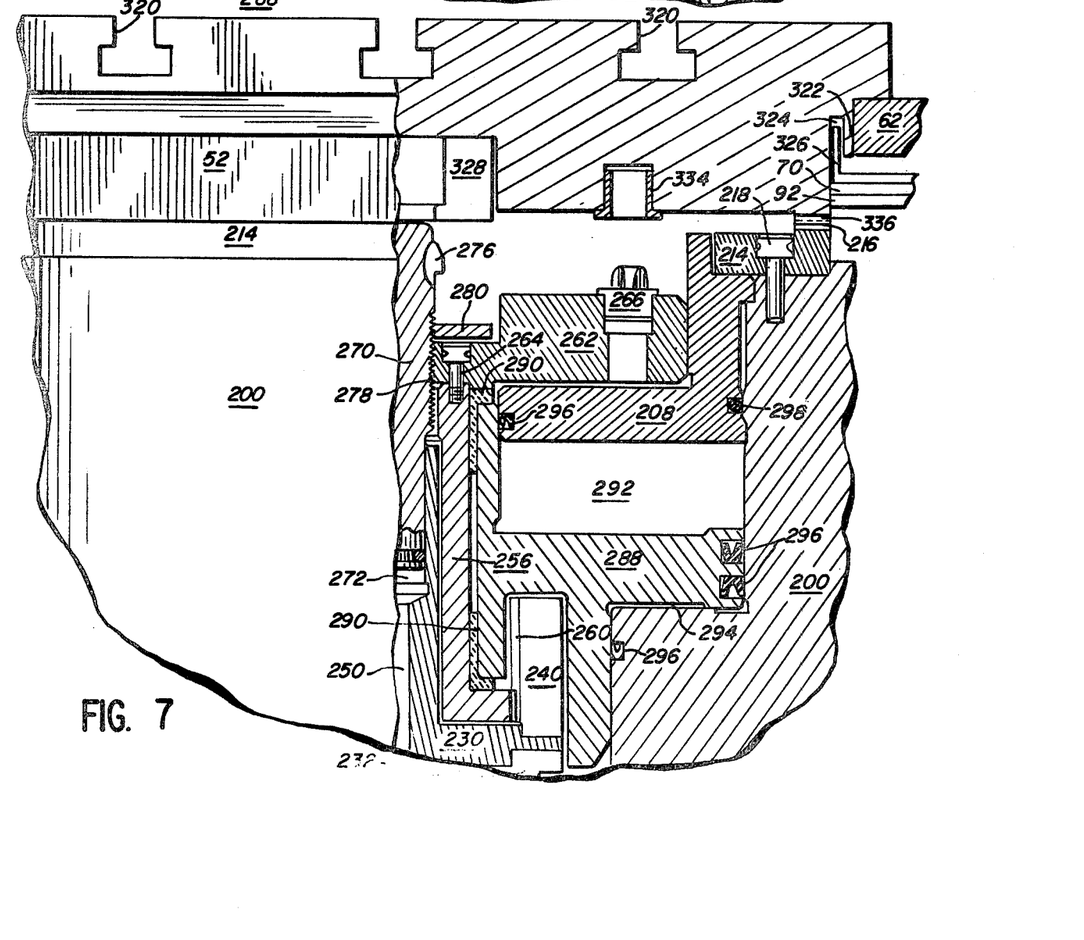
FIG. 7 is a partial view, half in cross-section similar to FIG. 6, showing the saddle in the changing position.

The pallet 52 is lowered onto the stand 62 in the standby position 58 shown in FIG. 8b so that the saddle 74 may be disengaged from the pallet 52 and oriented in the changing position (see FIG. 7). While in the changing position, the saddle 74 is driven under the second set of telescoping covers 90 and located beneath the other pallet 54 at the other standby position 60 as shown in FIG. 8c. While the saddle 74 moves between the pallets 52, 54, all three sets of telescoping covers 80, 90, 100 remain stationary.

The saddle 74 may then be caused to engage the pallet 54 and lift it off the stand 64 to the raised position (see FIG. 6). The new pallet 54 may then be moved into the machining position 56 by driving the saddle 74 in the X direction. When this occurs, the hood member 72 associated with that pallet 54 is carried to the machining position as well, causing the second set of telescoping covers 90 to telescope together and the third set of telescoping covers 100 to telescope apart. The pallet 54 may then be locked onto the saddle 74 by engaging the couplings 336, 216 as shown in FIG. 8d and machining of the workpiece 24 may take place.

It is apparent that the pallets 52, 54 are at all times supported either by the saddle 74 or by the stands 62, 64, and thus the weight of the pallets 52, 54 is never supported by their associated hood members 70, 72. Accordingly, the hood members 70, 72 may be made from relatively light weight material as are the telescoping covers 80, 90, 100.

The operation of the pallet changing system 50 ensures that the X axis machine ways and the saddle 74 remain covered at all times and thus are protected from metal shavings. It is particularly important that the curvic coupling 216 of the saddle 74 remain free of such shavings to enable the pallets 52, 54 to be properly coupled to the saddle 74 for machining.

Other aspects, objects and advantages of this invention can be obtained from a study of the drawings, the disclosure and the appended claims.

We claim:
1. A pallet changer for a machine tool comprising:
a base;
a track mounted on said base;
a first pallet capable of being shuttled over said track between a standby position at a first end of said track and a central work position;
a second pallet capable of being shuttled over said track between said central work position and a standby position at a second end of said track;
a set of telescoping cover members lined along said track and secured between said first and second pallets;
an indexing saddle;
means for coupling said saddle to either of said pallets, including
means for locking a coupled pallet against rotation with respect to said saddle,
means for disengaging said locking means, and
means for rotating said coupled pallet with respect to said saddle when said locking means is disengaged; and
means for driving said saddle along said track to either shuttle a coupled pallet or to move said saddle between said pallets and beneath said telescoping cover members.
2. The pallet changer of claim 1, further comprising:
a first set of telescoping end cover members secured to and extending between said first track end and said first pallet; and
a second set of telescoping end cover members secured to and extending between said second track end and said second pallet.

3. The pallet changer of claim 1, further comprising first and second hood members associated with said first and second pallets respectively, each of said hood members including an upright annular flange around an opening in said hood member, said flange being receivable in a groove defined by an annular rim on the associated pallet.

4. The pallet changer of claim 3, wherein said set of telescoping cover members has first and second terminal cover members fixed to the first and second hood members respectively.

5. The pallet changer of claim 1, further comprising means for holding said locking means in an engaged position.

6. The pallet changer of claim 5, wherein said holding means comprises:
   a shoulder around an opening in said pallet;
   a lug pin projectable from said saddle and receivable in said pallet opening;
   retractable lug members on said pin, said lug members being engageable with said pallet shoulder; and
   means for biasing said lug pin into said saddle.

7. The pallet changer of claim 1, wherein said locking means comprises:
   a first coupling surface on the bottom of each of said pallets; and
   a second coupling surface on the top of said saddle, whereby said coupling surfaces when engaged interact to prevent relative horizontal motion between said pallet and said saddle.

8. The pallet changer of claim 7, wherein said disengaging means comprises:
   a lift plate; and
   means for raising said lift plate to engage the bottom of said pallet and raise said pallet to disengage said coupling surfaces.

9. The pallet changer of claim 8, further comprising first and second stands at said respective standby positions, and shoulders on said pallets, wherein said lift plate raises said pallet so that its shoulders are above its associated stand.

10. A pallet changer for a machine tool comprising:
    a base;
    a track having first and second ends on said base;
    first and second pallets movable over said track, said first pallet being movable between first and second positions, said second pallet being movable between second and third positions, said first and third positions being standby positions associated with said first and second track ends respectively and said second position being a central work position;
    a first set of telescoping covers secured to and extending between said first track end and said first pallet;
    a second set of telescoping covers secured to and extending between said first and second pallets;
    a third set of telescoping covers secured to and extending between said second pallet and said second track end;
    an indexing saddle;
    means for coupling said saddle to either of said pallets, including
       a shoulder around an opening in said pallet;
       a lug pin projectable from said saddle and receivable in said pallet opening; and
       extendable lug members on said pin, said lug members when extended engaging said pallet shoulder to prevent separation of said pallet and said saddle; and
    means for driving said saddle along said track, said saddle when driven either moving said first or second pallet between said standby and said work positions or moving along under said second set of telescoping covers when not coupled to either pallet.

11. The pallet changer of claim 10, further comprising a pallet support stand at each standby position.

12. The pallet changer of claim 10, wherein the portion of the second set of telescoping covers under which the saddle moves includes no portion lower than the lowest portion of a pallet in the standby position.

13. The pallet changer of claim 10, further comprising first and second hood members associated with said first and second pallets respectively, said first hood member secured to said first and second set of telescoping covers and said second hood member secured to said second and third set of telescoping covers, and each of said hood members including an upright annular flange around an opening in said hood member and receivable in a groove defined by an annular rim on the associated pallet.

14. The pallet changer of claim 10, said coupling means further including:
    means for locking said pallet against rotation around said pin;
    means for raising said pallet to disengage said locking means; and
    means for rotating said pallet around said pin when said locking means are disengaged.

15. The pallet changer of claim 10, further comprising:
    first and second hood members associated with said first and second pallets respectively; and
    each of said sets of telescoping covers has two terminal cover members wherein:
       said first set of telescoping covers has one terminal cover member fixed relative to said first track and the other terminal cover member fixed to said first hood member,
       said second set of telescoping covers has one terminal cover member fixed to said first hood member and the other terminal cover member fixed to said second hood member,
       said third set of telescoping covers has one terminal cover member fixed to said second hood member and the other terminal cover member fixed relative to said second track end.

16. A pallet changer for a machine tool comprising:
    a base;
    a track having first and second ends on said base;
    first and second pallets movable over said track, said first pallet being movable between first and second positions, said second pallet being movable between second and third positions, said first and third positions being standby positions associated with said first and second track ends respectively and said second postition being a central work position;
    a first set of telescoping covers secured to and extending between said first track end and said first pallet;
    a second set of telescoping covers secured to and extending between said first and second pallets;
    a third set of telescoping covers secured to and extending between said second pallet and said second track end;

an indexing saddle;

means for coupling said saddle to either of said pallets, including coupling members on said pallet and said saddle, said coupling members when engaged preventing rotation of said pallet relative to said saddle; and means for driving said saddle along said track, said saddle when driven either moving said first or second pallet between said standby and said work positions or moving along under said second set of telescoping covers when not coupled to either pallet.

17. The pallet changer of claim 10, said coupling means further comprising means in said saddle for holding said pallet in a machining position with said coupling members engaged.

18. The pallet changer of claim 17, wherein said holding means comprises:
   a shoulder around an opening in said pallet;
   a lug pin projectable from said saddle and receivable in said pallet opening; and
   retractable lug members on said pin, said lug members when not retracted engaging said pallet shoulder to prevent separation of said pallet and said saddle.

19. The pallet changer of claim 16, wherein said coupling means further includes means for lifting said pallet to disengage said coupling members.

20. The pallet changer of claim 19, wherein said coupling means further includes:
   means for preventing rotation of said pallet relative to said lifting means when said pallet is lifted; and
   means for rotating said lifting means with respect to said saddle.

21. The pallet changer of claim 20, said coupling means further comprising means in said saddle for holding said pallet in a machining position with said coupling members engaged.

22. A pallet changer for a machine tool comprising:
   a base;
   a track mounted on said base;
   a first pallet capable of being shuttled over said track between first and second positions;
   a second pallet capable of being shuttled over said track between the first position and a third position, said first position being a machining position between said second and third positions;
   telescoping cover members lined along said track and fixed to said first pallet at one end and to said second pallet at the other end to permit movement of either pallet over said track while the other pallet is stationary;
   pallet supports at both said second and third positions;
   an indexing saddle;
   means for coupling said saddle to either of said pallets including
      means for locking said pallet against rotation with respect to said saddle,
      means for disengaging said locking means, and
      means for rotating said coupled pallet with respect to said saddle when said locking means is disengaged; and
   means for driving said saddle along said track.

23. The pallet changer of claim 22, further comprising hood members associated with each of said pallets and secured to the ends of said telescoping covers, each hood member further including an upright annular flange around an opening in said hood member and receivable in a groove defined by an annular rim on said pallet.

24. The pallet changer of claim 22, further comprising:
   a shoulder around an opening in said pallet;
   a lug pin projectable from said saddle and receivable in said pallet opening;
   retractable lug members on said pin, said lug members being engageable with said pallet shoulder; and
   means for biasing said lug pin into said saddle to engage said locking means.

25. The pallet changer of claim 22, wherein said disengaging means comprises:
   a lift plate; and
   means for raising said lift plate to engage the bottom of said pallet and raise said pallet above said pallet support.

* * * * *